W. L. TAYLOR.
CAR BRAKE.
APPLICATION FILED OCT. 30, 1908.
921,309.
Patented May 11, 1909.
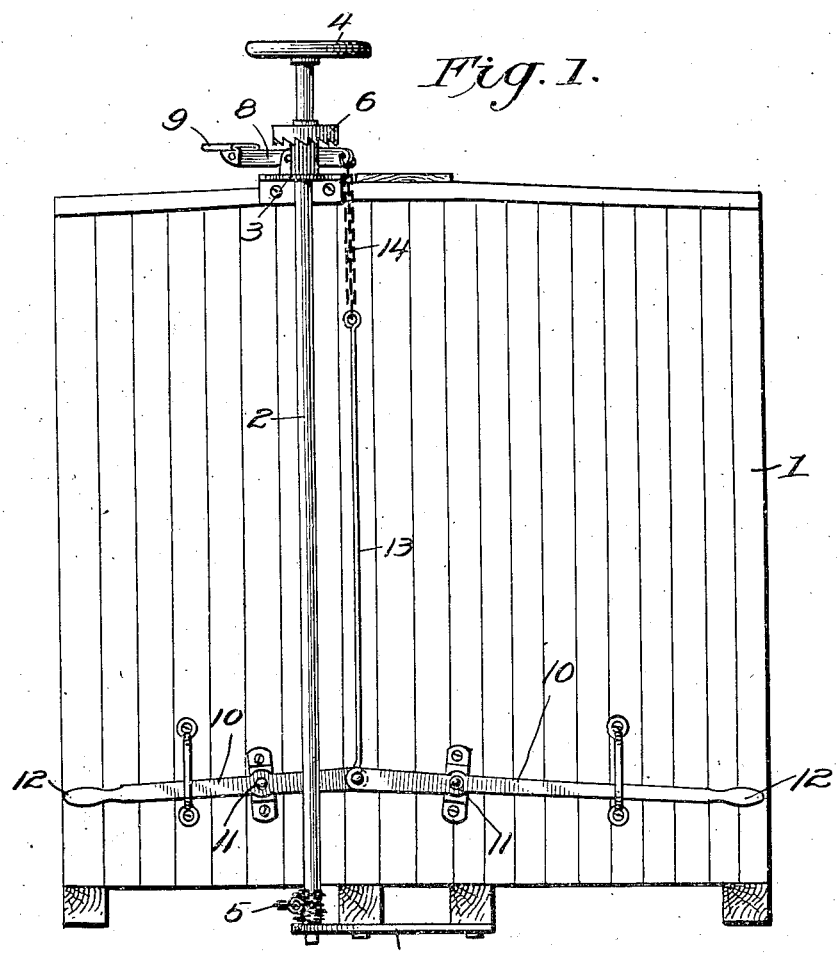
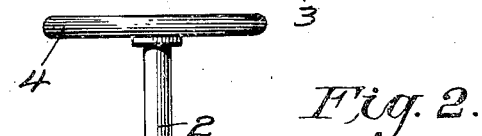
Witnesses
Jos. A. Ryan
C. C. Hines
Inventor
Walter L. Taylor.
By Victor J. Evans
Attorney

UNITED STATES PATENT OFFICE.

WALTER L. TAYLOR, OF DE RIDDER, LOUISIANA.

CAR-BRAKE.

No. 921,309.            Specification of Letters Patent.            Patented May 11, 1909.

Application filed October 30, 1908. Serial No. 460,316.

*To all whom it may concern:*

Be it known that I, WALTER L. TAYLOR, a citizen of the United States, residing at De Ridder, in the parish of Calcasieu and State of Louisiana, have invented new and useful Improvements in Car-Brakes, of which the following is a specification.

This invention relates to improvements in hand brakes for railway cars, and particularly to the brake mechanisms used upon freight cars, the object of the invention being to provide a means for locking the operating rod or shaft in brake applying position and permitting quick release of the same when it is desired to throw off the brakes.

Another object of the invention is to provide a releasing mechanism which may be operated from the top of the car or from the ground at either side of the car, the construction obviating the necessity of the brakeman climbing to the top of a car and passing from car to car in order to successively release the brakes of the cars of a train, and also obviating the dangers incident thereto.

The invention consists of the features of construction, combination and arrangement of parts hereinafter fully described and claimed, reference being had to the accompanying drawing, in which:—

Figure 1 is an end view of a freight car equipped with the invention. Fig. 2 is a detail view of the upper end of the shaft and the locking mechanism.

Referring to the drawing, 1 designates a car, at each end of which is arranged the ordinary vertical brake operating rod or shaft 2 journaled in suitable bearings 3, provided at its upper end with an operating hand wheel 4 and connected at its lower end with the usual brake chain 5. Ordinarily, the brake shaft is locked in brake applying position by a locking mechanism embodying a ratchet wheel at the upper end thereof adapted for engagement by a locking pawl on the top of the car. The rules of all railroad companies require the brakes of cars standing on a siding, switches, loading docks, etc., to be set, so that when the cars are coupled to a locomotive or train the brakeman is compelled to climb on top of the cars to release the brakes. It often happens that the car is taken out and connected up in the train without the brakes being released, owing to neglect or disobedience of orders by the brakeman in order to avoid the trouble of climbing to the tops of the cars, thus wearing the brake shoes and making the train pull heavily. The operation of climbing to the tops of the cars for the purpose of releasing the brakes is also a dangerous one, as in passing from car to car the brakeman is liable to slip and fall between cars. The object of the present invention is to provide a construction which will obviate these objections, by which the brake shaft may be locked in the usual manner and yet quickly released from the top of the car under ordinary conditions, and by which also the shaft may be released from below at either side of the car, thus enabling the brakes of a large number of cars to be quickly released without liability of danger to the brakeman.

In carrying my invention into practice, a disk or head 6 is fixed to the upper end of the shaft and formed on its underside with ratchet teeth. These teeth are adapted to be engaged by a bevel locking pawl 7 on a locking lever 8 fulcrumed upon the top of the car. The inner end of this lever terminates in a treadle or foot piece 9, by which the lever may be conveniently swung up or down on its pivot to throw the dog into and out of engagement with the ratchet teeth.

Arranged on opposite sides of the center of the end of the car are operating levers 10, fulcrumed at 11, and provided at their outer ends, which terminate near the sides of the car, with actuating handles 12. The inner ends of said levers are pivotally connected to the lower end of a rod 13 which is coupled at its upper end by a chain 14 to the forward end of the lever 8. It will be apparent that this construction enables the brakeman to pull down upon the rod by actuating the lever from either side of the car so as to swing the lever to withdraw the pawl from engagement with the ratchet wheel, thus releasing the shaft 2. Hence, it will be seen that the structure provides a means by which the brake shaft may be locked in set position, quickly released from the top of the car, or as quickly and conveniently released from the ground at either side of the car, thus obviating the necessity of a brakeman on the ground climbing to the top of the car or passing between adjacent cars to release a brake shaft.

Having thus fully described the invention, what is claimed as new is:—

1. In a brake operating mechanism, the combination of a car, a brake operating shaft journaled vertically upon the end of the car, locking mechanism upon the top of the shaft and car including a movable locking element having an actuating portion, operating devices upon the end of the car arranged to be actuated from the opposite sides thereof, and a connection between said devices and the said movable locking element.

2. In a brake operating mechanism, the combination of a car, a brake operating shaft journaled vertically upon the end of the car, locking mechanism upon the top of the shaft and car including a movable locking element having an actuating portion, pivot operating levers upon the end of the car arranged to be actuated from the opposite sides thereof, and a connection between said levers and the said movable locking element.

3. In a brake mechanism for cars, the combination of a car, a shaft journaled vertically upon the end of the car and provided at its upper end with an operating wheel and a ratchet disk, a pivoted locking lever carrying a dog to engage the teeth of the disk and provided at one end with an actuating portion, operating levers upon the end of the car arranged to be operated from the opposite sides thereof, and a connection between said levers and the locking lever whereby the latter may be retracted.

4. In a brake mechanism for cars, the combination of a car, a shaft journaled vertically upon the end of the car and provided at its upper end with a hand wheel and a ratchet disk, a locking lever pivoted upon the top of the car and having a dog on one side of its pivotal connection to engage said ratchet disk and an operating portion at the opposite side of its pivotal connection, levers mounted upon the end of the car and having operating portions arranged adjacent the sides thereof, and means pivotally connecting the inner ends of said levers to the dog carrying portion of the locking lever.

In testimony whereof I affix my signature in presence of two witnesses.

WALTER L. TAYLOR.

Witnesses:
  J. A. BAILEY,
  J. F. MARSHALL.